United States Patent
Jang

(10) Patent No.: US 10,490,781 B2
(45) Date of Patent: Nov. 26, 2019

(54) RECHARGEABLE BATTERY HAVING CORNER FOLDING PORTION

(71) Applicant: SAMSUNG SDI CO., LTD., Yongin-si, Gyeonggi-do (KR)

(72) Inventor: Hyun-Joong Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 144 days.

(21) Appl. No.: 14/671,722

(22) Filed: Mar. 27, 2015

(65) Prior Publication Data

US 2015/0364729 A1 Dec. 17, 2015

(30) Foreign Application Priority Data

Jun. 17, 2014 (KR) ........................ 10-2014-0073669

(51) Int. Cl.
*H01M 2/00* (2006.01)
*H01M 2/02* (2006.01)

(52) U.S. Cl.
CPC .......... *H01M 2/0275* (2013.01); *H01M 2/021* (2013.01)

(58) Field of Classification Search
CPC ....... H01M 2/02–0295; H01M 2/0275; H01M 2/021
See application file for complete search history.

(56) References Cited

U.S. PATENT DOCUMENTS

| 6,319,630 | B1 * | 11/2001 | Hasegawa | H01M 2/0202 429/124 |
| 2005/0084749 | A1 * | 4/2005 | Hwang | H01M 2/0202 429/127 |
| 2010/0003594 | A1 * | 1/2010 | Hong | H01M 2/021 429/163 |

FOREIGN PATENT DOCUMENTS

| CN | 1610166 A | 4/2005 |
| CN | 201868521 U | 6/2011 |
| CN | 103715448 A | 4/2014 |
| JP | 2007200589 A | * 8/2007 |
| JP | 2009-123582 A | 6/2009 |
| KR | 10-2005-0036466 A | 4/2005 |
| KR | 10-2009-0121629 A | 11/2009 |

OTHER PUBLICATIONS

Machine translation of JP-2007200589-A, obtained Oct. 18, 2018 (Year: 2007).*
SIPO Office Action, with English translation, dated Aug. 3, 2018, for corresponding Chinese Patent Application No. 201510324238.4 (11 pages).
Chinese Notification of the Second Office Action, for Patent Application No. 201510324238.4, dated Apr. 12, 2019, 3 pages.

(Continued)

*Primary Examiner* — Nicholas P D'Aniello
(74) *Attorney, Agent, or Firm* — Lewis Roca Rothgerber Christie LLP

(57) ABSTRACT

A rechargeable battery includes: an electrode assembly; and a pouch case including a receiving portion accommodating the electrode assembly, and an edge portion at an outer side of the receiving portion, the edge portion including a first bent portion extending in a length direction of the edge portion, a second bent portion extending in a length direction of the edge portion, the first bent portion being bent relative to the second bent portion, and a bent corner folding portion at a corner of the edge portion.

17 Claims, 5 Drawing Sheets

(56) References Cited

OTHER PUBLICATIONS

English translation of the Chinese Notification of the Second Office Action, for Patent Application No. 201510324238.4, dated Apr. 12, 2019, 4 pages.
Chinese Patent Office Search Report with English Translation for corresponding Chinese Patent Application No. 201510324238.4, dated Aug. 23, 2019, which is attached to the Chinese Notice of Allowance dated Sep. 9, 2019, 4 pages.

\* cited by examiner

RECHARGEABLE BATTERY HAVING CORNER FOLDING PORTION

CROSS-REFERENCE TO RELATED APPLICATION

This application claims priority to and the benefit of Korean Patent Application No. 10-2014-0073669, filed Jun. 17, 2014 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery differs from a primary battery in that it can be repeatedly charged and discharged, while the latter is incapable of being recharged.

A low-capacity rechargeable battery is used in small portable electronic devices, such as mobile phones, notebook computers, and camcorders, while a high-capacity rechargeable battery can be widely used as a power source for driving a motor, such as of hybrid vehicles, electric vehicles, and the like.

Recently, high-power rechargeable batteries using a non-aqueous electrolyte and having high energy density have been developed, and the high-power rechargeable batteries are coupled in series or parallel, thereby forming a high-power, large-capacity battery module.

In general, the rechargeable battery is provided with an electrode assembly including a positive electrode, a negative electrode, and a separator interposed therebetween.

The electrode assembly is inserted in a case to perform charging and discharging operations, and is provided with terminals to and from which a current is supplied or drawn out.

The case may be formed of a metal plate or pouch, and a pouch case is formed as a laminate film in which a metal film is interposed between insulating layers.

When a corner protrudes in such a pouch case, there is a risk of causing a short circuit with a neighboring battery.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, a rechargeable battery has a corner folding portion. According to another aspect of embodiments of the present invention, in a rechargeable battery, a corner of a pouch case is prevented or substantially prevented from protruding.

According to one or more exemplary embodiments of the present invention, a rechargeable battery includes: an electrode assembly; and a pouch case including a receiving portion accommodating the electrode assembly, and an edge portion at an outer side of the receiving portion, the edge portion including a first bent portion extending in a length direction of the edge portion, a second bent portion extending in a length direction of the edge portion, the first bent portion being bent relative to the second bent portion, and a bent corner folding portion at a corner of the edge portion.

The corner folding portion may be positioned between the first bent portion and the second bent portion. The corner folding portion may be slantedly bent with respect to a length direction of the first bent portion.

The rechargeable battery may include a positive electrode tab and a negative electrode tab that are electrically coupled to the electrode assembly and that protrude outwardly from the pouch case, and the corner folding portion may be formed at a corner of an end portion of the pouch case that is opposite to an end portion from which the positive and negative electrode tabs protrude.

The first bent portion may be attached to a lateral side of the receiving portion. The first bent portion may be attached to the lateral side of the receiving portion through an adhesive layer between the receiving portion and the first bent portion.

A width of the second bent portion may be greater than a width of the first bent portion. The width of the second bent portion may be 1.1 to 1.3 times the width of the first bent portion.

A width of the corner folding portion may be less than the width of the first bent portion. The width of the corner folding portion may be 0.5 to 0.8 times the width of the first bent portion.

According to an aspect of embodiments of the present invention, a corner folding portion is formed to be positioned between a first folding portion and a second folding portion, thereby preventing or substantially preventing the corners from protruding to cause a short circuit.

BRIEF DESCRIPTION OF THE DRAWINGS

Some example embodiments of the present invention are described more fully hereinafter with reference to the accompanying drawings; however, the present invention may be embodied in different forms and should not be construed as limited to the embodiments set forth herein. Rather, the accompanying drawings, together with the specification, illustrate some example embodiments of the present invention, and serve to explain principles and aspects of the present invention. Also, some dimensions in the drawings may be exaggerated for clarity.

DESCRIPTION OF REFERENCE NUMERALS INDICATING SOME ELEMENTS IN THE DRAWINGS

Figure 1:
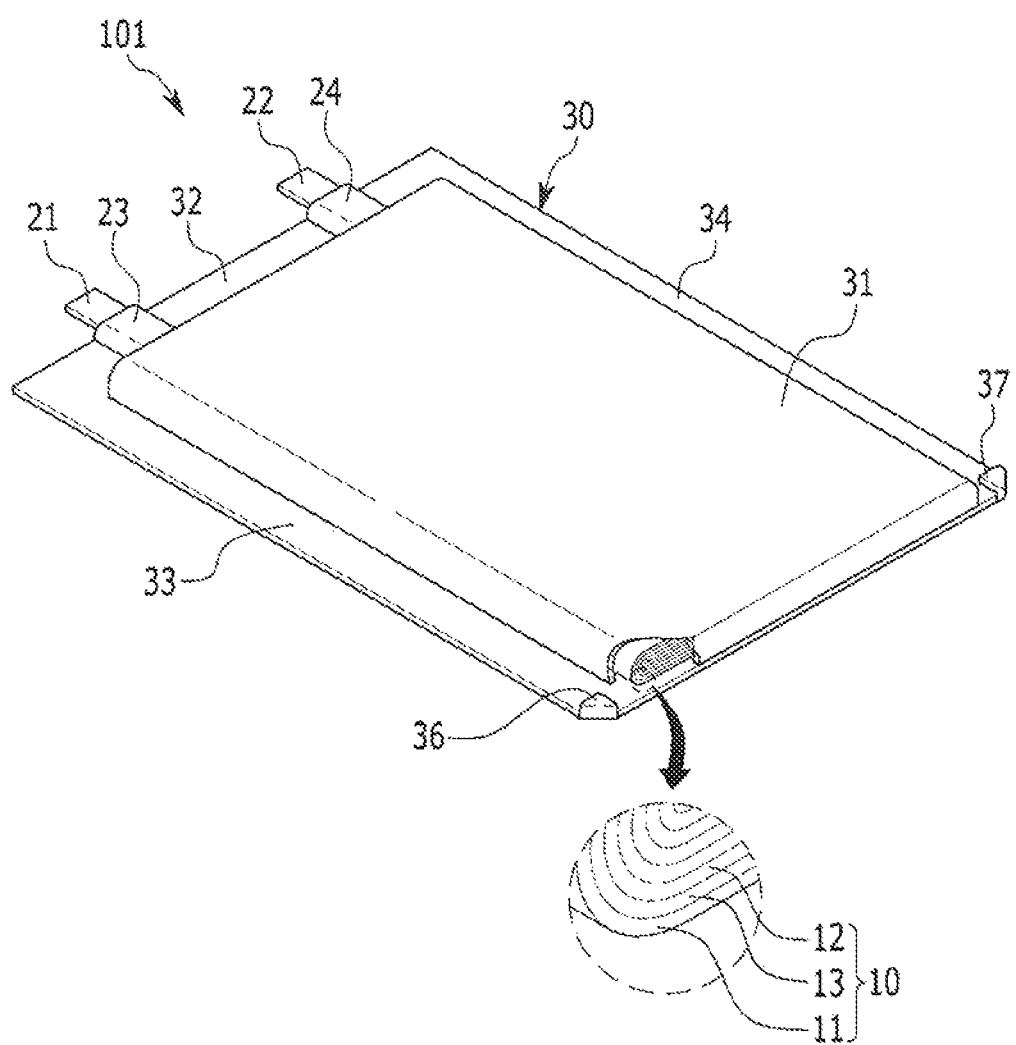
FIG. 1 is a perspective view of a rechargeable battery according to an exemplary embodiment of the present invention.

| | |
|---|---|
| 101: rechargeable battery | 10: electrode assembly |
| 11: positive electrode | 12: negative electrode |
| 13: separator | 21: positive electrode tab |
| 22: negative electrode tab | 23, 24: protective tape |
| 30: pouch case | 31: receiving portion |
| 32: upper edge | 33: first lateral edge portion |
| 34: second lateral edge portion | 33a, 34a: first bent portion |

| | |
|---|---|
| 33b, 34b: second bent portion | 36, 37: corner folding portion |
| 40: adhesive layer | |

DETAILED DESCRIPTION

The present invention will be described more fully hereinafter with reference to the accompanying drawings, in which some exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification and the drawings.

Figure 2:
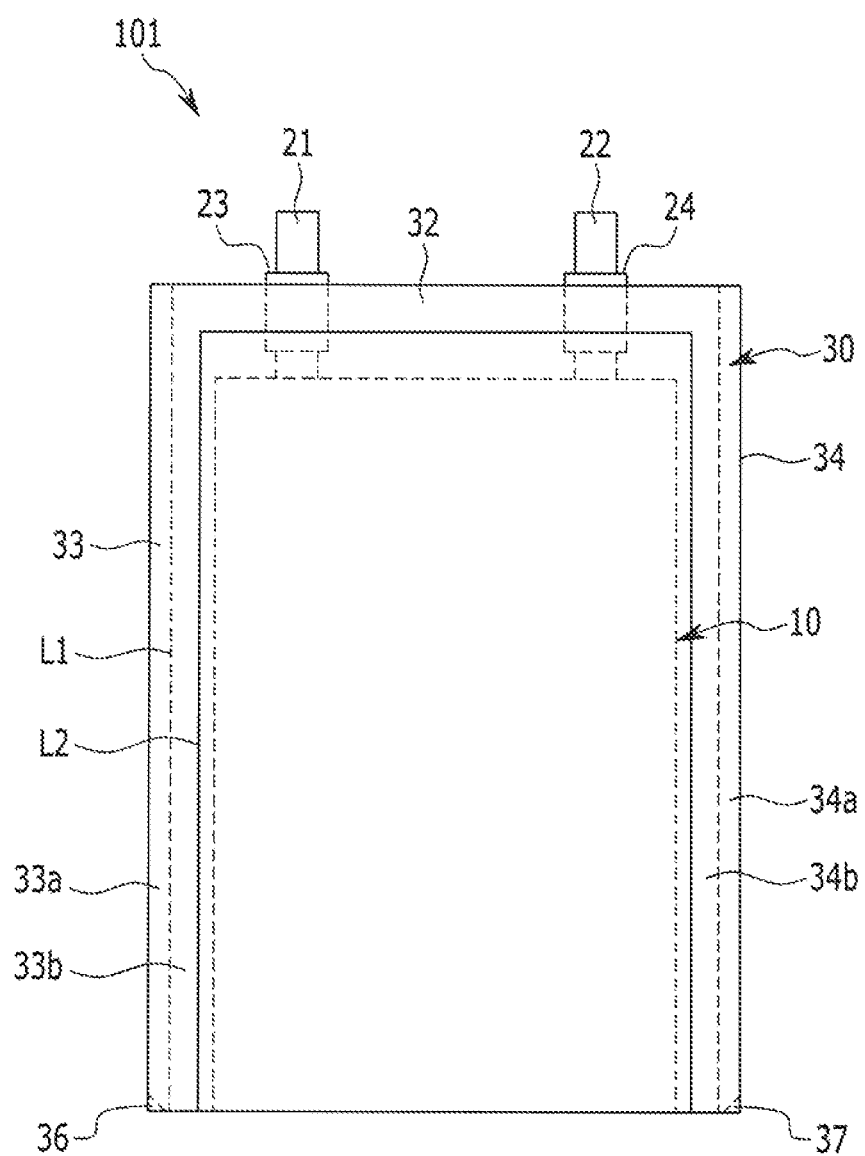
FIG. 2 is a top view of the rechargeable battery of FIG. 1.

FIG. 1 is a perspective view of a rechargeable battery according to an exemplary embodiment of the present invention; and FIG. 2 is a top view of the rechargeable battery shown in FIG. 1.

Referring to FIGS. 1 and 2, a rechargeable battery 101 according to an exemplary embodiment of the present invention includes an electrode assembly 10 for performing charging and discharging operations, a pouch case 30 for accommodating the electrode assembly 10, and positive and negative electrode tabs 21 and 22 electrically coupled to the electrode assembly 10 and protruding outwardly from the pouch case 30.

The electrode assembly 10 includes a positive electrode 11, a negative electrode 12, and a separator 13 interposed between the positive and negative electrodes 11 and 12.

The positive electrode 11, in one embodiment, includes a positive electrode current collector that is formed of a strip-shaped thin metallic plate, and a positive electrode active material layer that is coated on one surface or opposite surfaces of the positive electrode current collector.

The positive electrode current collector may be formed of a metallic material having excellent conductivity such as a thin aluminum plate, for example.

The positive electrode active material layer may be formed of a material in which a lithium-based oxide is mixed with a binder, a conductive material, etc.

The negative electrode 12, in one embodiment, includes a negative electrode current collector that is formed of a strip-shaped thin metallic plate, and a negative active material layer that is coated on one surface or opposite surfaces of the negative electrode current collector.

The negative electrode current collector may be formed of a metallic material having excellent conductivity, such as a thin copper plate, for example.

The negative active material layer may be formed of a material in which a negative active material such as a carbon material and the like is mixed with a binder, a conductive material, and the like.

The separator 13 is formed of a porous material and may be formed of polyolefin, polyethylene, polypropylene, etc.

The positive electrode 11 includes a positive electrode coated region where a positive electrode active material layer is coated, and a positive electrode uncoated region where a positive electrode active material layer is not coated.

The negative electrode 12 includes a negative electrode coated region where a negative active material layer is coated, and a negative electrode uncoated region where a negative active material layer is not coated.

In one embodiment, the positive electrode uncoated region is disposed at one lateral end of the electrode assembly 10 in a length direction thereof, and the negative electrode uncoated region is disposed at the other lateral end of the electrode assembly 10 in the length direction thereof.

The positive electrode tab 21 is bonded to the positive electrode uncoated region, and the negative electrode tab 22 is bonded to the negative electrode uncoated region.

The positive and negative electrode tabs 21 and 22 protrude outwardly from the pouch case 30, and protective tapes 23 and 24 are wound around the positive and negative electrode tabs 21 and 22 to insulate the pouch case 30 therefrom.

In one embodiment, the pouch case 30 includes upper and lower plates, and the upper and lower plates are thermobonded to form a receiving portion 31 and an edge portion.

The receiving portion 31, in one embodiment, convexly protrudes to accommodate the electrode assembly 10 and is disposed at a center of the pouch case 30.

The receiving portion 31 may have a quadrangular cross-sectional shape.

The edge portion, in one embodiment, includes an upper edge portion 32 from which the positive and negative electrode tabs 21 and 22 protrude, and first and second lateral edge portions 33 and 34 that are fanned to be coupled to lateral ends of the upper edge portion 32.

The first lateral edge portion 33 is formed with a first bent portion 33a that extends in a length direction of the first lateral edge portion 33 to be folded, and a second bent portion 33b that is positioned inwardly from the first bent portion 33a.

The first bent portion 33a is bent based on a first line L1 that extends in the length direction of the first lateral edge portion 33, and the second bent portion 33b is bent based on a second line L2 that extends in the length direction of the first lateral edge portion 33.

The first line L1 and the second line L2 are disposed in parallel with each other, and the second line L2 may correspond to a lower end of a lateral side of the receiving portion 31.

Figure 3:
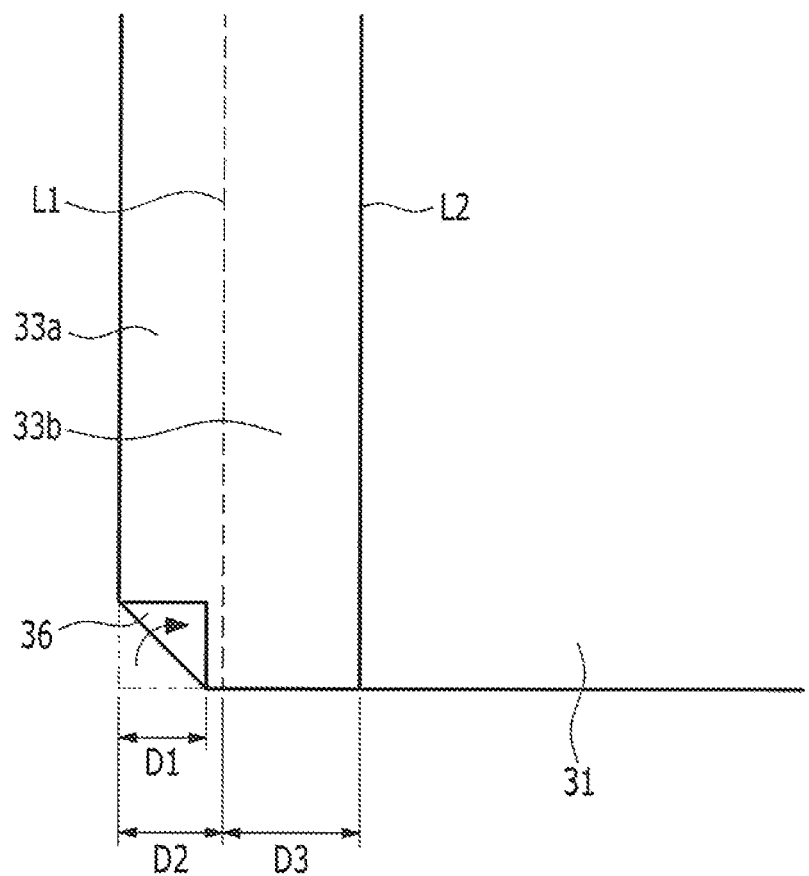
FIG. 3 is a partial top view of the rechargeable battery of FIG. 1.

FIG. 3 is a partial top view of the rechargeable battery 101 according to the exemplary embodiment of the present invention.

Referring to FIG. 3, a width D3 of the second bent portion 33b is formed to be larger than a width D2 of the first bent portion 33a, and, in one embodiment, the width D3 of the second bent portion 33b is formed to be 1.1 to 1.3 times the width D2 of the first bent portion 33a.

The width D3 of the second bent portion 33b being 1.1 to 1.3 times the width D2 of the first bent portion 33a provides for stable positioning of the first bent portion 33a between the second bent portion 33b and the lateral side of the receiving portion 31.

In addition, as shown in FIGS. 2 and 3, a corner folding portion 36 is formed to be bent at a corner of the first bent portion 33a, and in the pouch case 30, the corner folding portion 38 is formed at a corner of an end portion that is opposite to the other end portion from which the positive and negative electrode tabs 21 and 22 protrude.

The corner folding portion 36 is slantedly bent with respect to the length direction of the first bent portion 33a such that the corner folding portion 36 is substantially formed in the shape of a triangular plate.

A maximum width D1 of the corner folding portion 36 is formed to be smaller than the width D2 of the first bent portion 33a, and, in one embodiment, the maximum width D1 of the corner folding portion 36 is formed to be 0.5 to 0.8 times the width D2 of the first bent portion 33a.

If the maximum width D1 of the corner folding portion 36 is larger than the width D2 of the first bent portion 33a, the corner folding portion 36 may have an excessively large thickness when being folded.

The corner folding portion 36 may be stably positioned between the first bent portion 33a and the second bent portion 33b if the maximum width D1 of the corner folding portion 36 is formed to be 0.5 to 0.8 times the width D2 of the first bent portion 33a.

Similarly, the second lateral edge portion 34 is formed with a first bent portion 34a that extends in a length direction of the second lateral edge portion 34 to be folded, and a second bent portion 34b that is positioned inwardly from the first bent portion 34a.

In addition, a corner folding portion 37 is formed at a lower corner of the first bent portion 34a to be bent in the shape of a triangle.

Figure 4A:
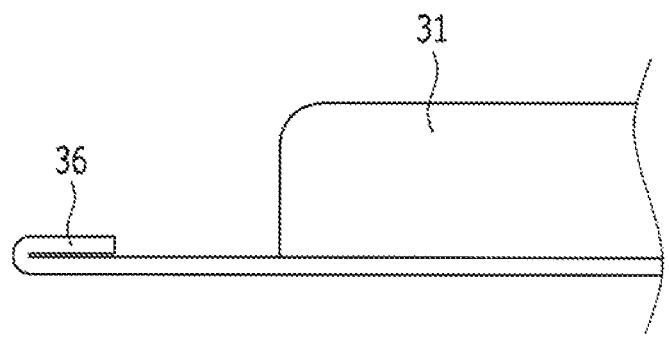
FIG. 4A is a side view of a corner folding portion folded in the rechargeable battery of FIG. 1.
Figure 4B:
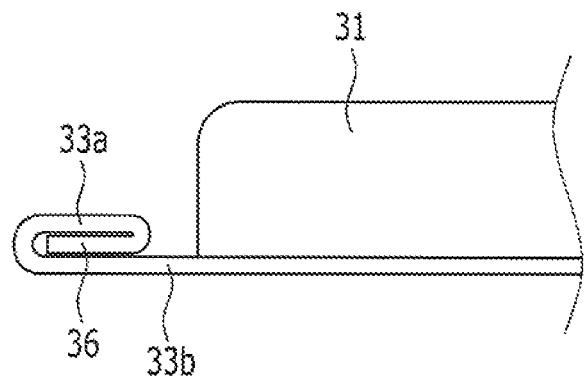
FIG. 4B is a side view of a first bent portion folded in the rechargeable battery of FIG. 4A.
Figure 4C:
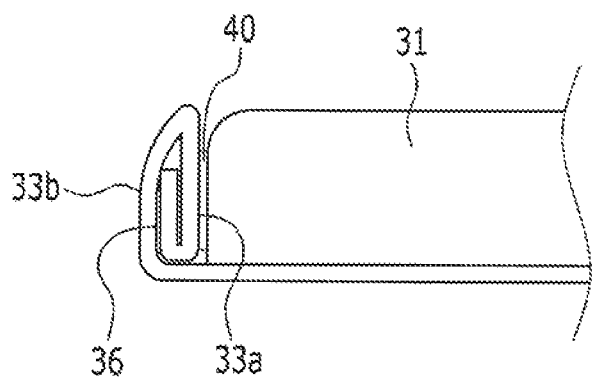
FIG. 4C is a side view of a second bent portion folded in the rechargeable battery of FIG. 4B.

FIG. 4A is a side view of the corner folding portion 36 folded in the rechargeable battery 101 according to the exemplary embodiment of the present invention; FIG. 4B is a side view of the first bent portion 33a folded in the rechargeable battery 101 according to the exemplary embodiment of the present invention; and FIG. 4C is a side view of the second bent portion 33b folded in the rechargeable battery 101 according to the exemplary embodiment of the present invention.

A forming method of the corner folding portion 36, the first bent portion 33a, and the second bent portion 33b is described below with reference to FIGS. 4A to 4C. The corner folding portion 36 is formed, as shown in FIG. 4A, by folding the lower corner of the pouch case 30.

Then, the first lateral edge portion 33 is partially folded along the first line L1, as shown in FIG. 4B, to form the first bent portion 33a.

Thus, the corner folding portion 36 is positioned between the first bent portion 33a and the second bent portion 33b.

Then, as shown in FIG. 4C, the second bent portion 33b is bent to be erected in parallel with the lateral side of the receiving portion 31.

As a result, the first bent portion 33a and the corner folding portion 36 are positioned between the second bent portion 33b and the lateral side of the receiving portion 31, and the first bent portion 33a may be attached to the lateral side of the receiving portion 31.

In one embodiment, an adhesive layer 40 is formed between the first bent portion 33a and the receiving portion 31, and the adhesive layer 40 supports the first bent portion 33a.

The adhesive layer 40 may be formed of an adhesive tape or an applied adhesive material.

As described above, once the corner folding portions 36 and 37 are formed, a short circuit caused by an outwardly protruding corner can be prevented.

Even if a thickness of the rechargeable battery 101 is thin, thicknesses of the edge portions 33 and 34 may not be decreased so as to secure sealing performance.

Thus, if the widths of the edge portions 33 and 34 are formed to be higher than a height of the receiving portion 31 such that the edge portions 33 and 34 are erected to be fixed to the lateral sides of the receiving portion 31, there is a problem that the edge portions 33 and 34 upwardly protrude further than the receiving portion 31.

In the present exemplary embodiment, in order to solve such a problem, the edge portions 33 and 34 are folded several times to be attached to the lateral sides of the receiving portion 31.

However, when the edge portions 33 and 34 are folded several times, misalignment may occur to cause corners of the edge portions 33 and 34 to outwardly protrude.

However, according to the present exemplary embodiment, since the corner folding portions 36 and 37 are formed, the corners do not outwardly protrude even when the edge portions 33 and 34 are folded several times.

In addition, the corner folding portions 36 and 37 according to the present exemplary embodiment are positioned between the first bent portions 33a and 34a and the second bent portions 33b and 34b, thereby preventing or substantially preventing the corner folding portions 36 and 37 from being unfolded.

While the present invention has been described in connection with some exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly; and
a pouch case comprising:
    a receiving portion accommodating the electrode assembly; and
    an edge portion at a first outer side of the receiving portion, the first outer side being spaced apart from a second outer side of the receiving portion in a width direction, the edge portion including a first bent portion extending in a length direction of the edge portion that is perpendicular to the width direction, a second bent portion extending in the length direction of the edge portion, the first bent portion being bent about a first bending line relative to the second bent portion, the second bent portion being bent about a second bending line, the second bending line being different from the first bending line, and a bent corner folding portion at a corner of the edge portion and bent in a direction from a first end of the pouch case toward a second end of the pouch case that is spaced apart in the length direction from the first end, the bent corner folding portion being bent about a third bending line relative to the first bent portion and the second bent portion, the third bending line being different from the first and second bending lines, the bent corner folding portion being positioned between the first bent portion and the second bent portion, wherein the edge portion includes an outer edge extending in the length direction, the outer edge being continuous at a location along the third bending line, and the bent corner folding portion is bent so as to be arranged between the outer edge and the first bending line.

2. The rechargeable battery of claim 1, wherein the corner folding portion is slantedly bent with respect to a length direction of the first bent portion.

3. The rechargeable battery of claim 1, wherein the rechargeable battery includes a positive electrode tab and a negative electrode tab that are electrically coupled to the electrode assembly and that protrude outwardly from the pouch case, and the corner folding portion is formed at a corner of an end portion of the pouch case that is opposite to an end portion from which the positive and negative electrode tabs protrude.

4. The rechargeable battery of claim 1, wherein the first bent portion is attached to a lateral side of the receiving portion.

5. The rechargeable battery of claim 4, wherein the first bent portion is attached to the lateral side of the receiving portion through an adhesive layer between the receiving portion and the first bent portion.

6. The rechargeable battery of claim 1, wherein a width of the second bent portion is greater than a width of the first bent portion.

7. The rechargeable battery of claim 6, wherein the width of the second bent portion is 1.1 to 1.3 times the width of the first bent portion.

8. A rechargeable battery comprising:
an electrode assembly; and
a pouch case comprising:
  a receiving portion accommodating the electrode assembly; and
  an edge portion at a first outer side of the receiving portion, the first outer side being spaced apart from a second outer side of the receiving portion in a width direction, the edge portion including a first bent portion extending in a length direction of the edge portion that is perpendicular to the width direction, a second bent portion extending in the length direction of the edge portion, the first bent portion being bent about a first bending line relative to the second bent portion, the second bent portion being bent about a second bending line, the second bending line being different from the first bending line, and a bent corner folding portion at a corner of the edge portion and bent in a direction from a first end of the pouch case toward a second end of the pouch case that is spaced apart in the length direction from the first end, the bent corner folding portion being bent about a third bending line relative to the first bent portion and the second bent portion, the third bending line being different from the first and second bending lines, wherein a width of the corner folding portion is less than a width of the first bent portion such that the corner folding portion is spaced apart from the first bending line, wherein the edge portion includes an outer edge extending in the length direction, and the bent corner folding portion is bent so as to be arranged between the outer edge and the first bending line.

9. The rechargeable battery of claim 8, wherein the width of the corner folding portion is 0.5 to 0.8 times the width of the first bent portion.

10. The rechargeable battery of claim 1, wherein the pouch case further comprises another edge portion at the second outer side of the receiving portion, the another edge portion including another first bent portion extending in the length direction, another second bent portion extending in the length direction, the another first bent portion being bent relative to the another second bent portion, and another bent corner folding portion at a corner of the another edge portion.

11. The rechargeable battery of claim 3, wherein the positive electrode tab and the negative electrode tab protrude outwardly from the pouch case in the length direction.

12. The rechargeable battery of claim 4, wherein the lateral side of the receiving portion faces the width direction.

13. The rechargeable battery of claim 4, wherein the lateral side of the receiving portion is spaced apart from another lateral side of the receiving portion in the width direction, and the electrode assembly is accommodated in the receiving portion between the lateral side and the another lateral side.

14. The rechargeable battery of claim 1, wherein the second bending line is parallel with the first bending line.

15. The rechargeable battery of claim 1, wherein the third bending line extends in a direction crossing the first and second bending lines.

16. The rechargeable battery of claim 1, wherein the bent corner folding portion is bent so as to be entirely arranged between the outer edge and the first bending line.

17. The rechargeable battery of claim 8, wherein the bent corner folding portion is bent so as to be entirely arranged between the outer edge and the first bending line.

* * * * *